(12) United States Patent
Stephenson et al.

(10) Patent No.: US 6,556,262 B1
(45) Date of Patent: Apr. 29, 2003

(54) DISPLAY SHEET HAVING MEMORY USING LIMITED COALESCENCE DOMAINS

(75) Inventors: Stanley W. Stephenson, Spencerport, NY (US); John W. Boettcher, Webster, NY (US); David J. Giacherio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/478,963

(22) Filed: Jan. 6, 2000

(51) Int. Cl.$^7$ .............................................. G02F 1/1333
(52) U.S. Cl. .............................. 349/86; 349/89; 349/92; 349/185
(58) Field of Search ............................. 349/86, 92, 93, 349/89, 80, 183, 185

(56) References Cited

U.S. PATENT DOCUMENTS

| | | |
|---|---|---|
| 2,932,629 A | 4/1960 | Wiley |
| 3,697,297 A | 10/1972 | Churchill et al. |
| 3,933,771 A | 1/1976 | Eastman et al. |
| 4,324,932 A | 4/1982 | Link et al. |
| 4,435,047 A | 3/1984 | Fergason |
| 4,833,060 A | 5/1989 | Nair et al. |
| 5,437,811 A | 8/1995 | Doane et al. |
| 5,695,682 A | 12/1997 | Doane et al. |
| 5,867,238 A * | 2/1999 | Miller et al. ................... 349/92 |
| 6,204,908 B1 * | 3/2001 | Hashimoto et al. ......... 349/176 |
| 6,271,898 B1 * | 8/2001 | Clikeman et al. .............. 349/86 |
| 6,300,932 B1 * | 9/2001 | Albert ........................ 345/107 |

FOREIGN PATENT DOCUMENTS

| | | |
|---|---|---|
| EP | 0 665 279 | 8/1995 |
| WO | WO 97/04398 | 2/1997 |

* cited by examiner

*Primary Examiner*—Robert H. Kim
*Assistant Examiner*—David Chung
(74) *Attorney, Agent, or Firm*—Raymond L. Owens

(57) ABSTRACT

A light-modulating electrically responsive sheet including a substrate and electrically conductive layer formed over the substrate. The sheet further includes a light-modulating layer disposed over the electrically conductive layer and including at least one dispersible light-modulating material and coalescence limiting material into which the dispersible light-modulating material(s) is provided so that such dispersible light-modulating material coalesces to form a limited coalesced material having a set of domains each having a set of domains that exhibit different electrically responsive optical states.

3 Claims, 4 Drawing Sheets

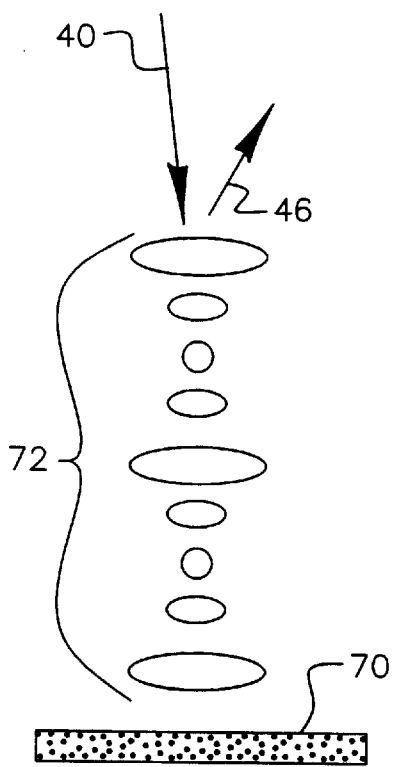
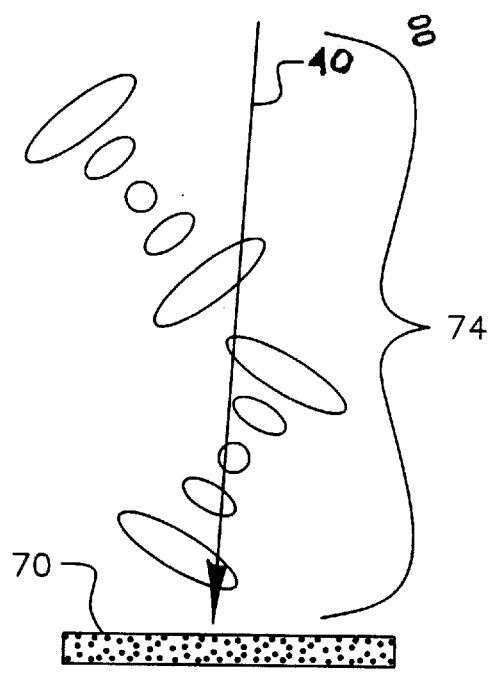
*FIG. 3A*     *FIG. 3B*
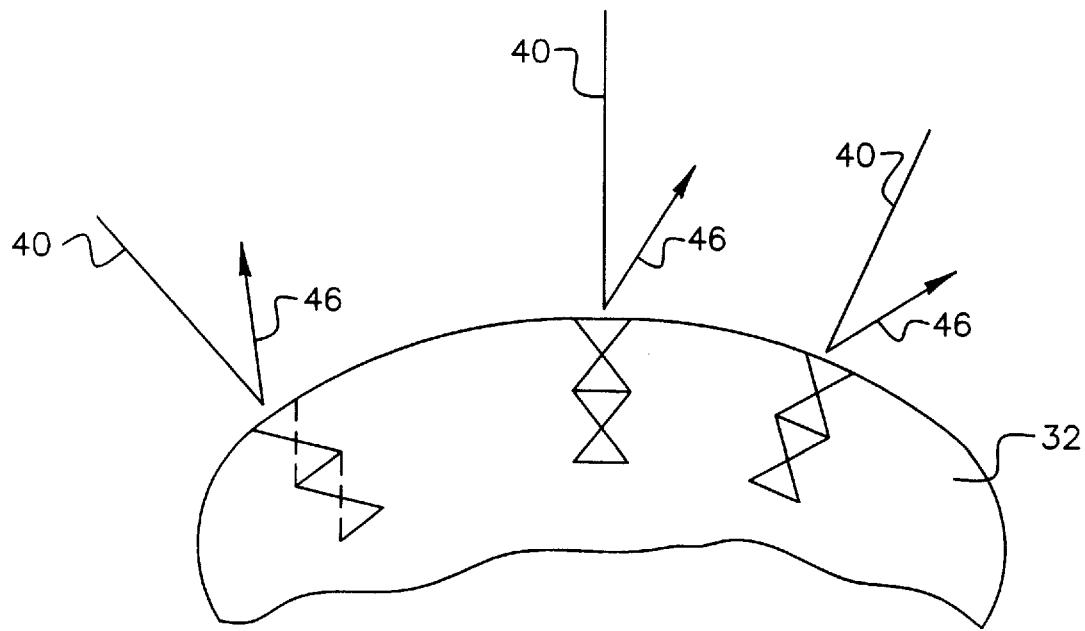
*FIG. 4*

DISPLAY SHEET HAVING MEMORY USING LIMITED COALESCENCE DOMAINS

CROSS REFERENCE TO RELATED APPLICATIONS

Reference is made to commonly assigned U.S. patent application Ser. No. 09/105,507 filed Jan. 26, 1998; Ser. No. 09/379,776 filed Aug. 24, 1999; Ser. No. 09/478,683 filed Jan. 6, 2000 entitled "Method for Making Materials Having Uniform Limited Coalescence Domains" by Stanley W. Stephenson et al.; and Ser. No. 09/478,487 filed Jan. 6, 2000 entitled "Light-modulating, Electrically Responsive Privacy Screen" by Stanley W. Stephenson et al.; the disclosures of which are incorporated herein by reference.

FIELD OF THE INVENTION

The present invention relates to coatable sheets having light-modulating material.

BACKGROUND OF THE INVENTION

Currently information is displayed on sheets using permanent inks or displayed on electronically modulated surfaces such as cathode ray displays or liquid crystal displays. Other sheet materials can carry magnetically writable areas to carry ticketing or financial information, however magnetically written data is not visible.

World patent application PCT/WO 97/04398, entitled "Electronic Book With Multiple Display Pages", is a thorough recitation of the art of thin, electronically written sheet display technologies. Disclosed is the assembling of multiple display sheets that are bound into a "book", each sheet provided with means to individually address each page. The patent recites prior art in forming thin, electronically written pages, including flexible sheets, image modulating material formed from a bi-stable liquid crystal system, and thin metallic conductor lines on each page.

Heretofore, U.S. Pat. No. 3,697,297, discloses material suitable for such a device. A cholesteric liquid crystal material is encapsulated by light penetrable gelatin and gum arabic capsules that are coated on a screen. The screen changes color when receiving sufficient heat energy to clear the cholesteric material.

Fabrication of flexible, electronically written display sheets using liquid crystals materials was advanced by U.S. Pat. No. 4,435,047. A first sheet has transparent ITO conductive areas and a second sheet has electrically conductive inks printed on display areas. The sheets can be thin glass, but in practice have been formed of Mylar polyester. A dispersion of liquid crystal material in a binder is coated on the first sheet, and the second sheet is bonded to the liquid crystal material. Electrical potential is applied to opposing conductive areas to operate on the liquid crystal material and expose display areas. The display uses nematic liquid crystal materials, which ceases to present an image when de-energized. Currently, privacy windows are created using the scattering properties of conventional nematic liquid crystals. Such materials require continuous electrical drive to remain transparent.

U.S. Pat. No. 5,437,811 discloses a light-modulating cell having a polymerically dispersed chiral nematic liquid crystal. The chiral nematic liquid crystal has the property of being driven between a planar state reflecting a specific visible wavelength of light and a light scattering focal-conic state. Said structure has the capacity of maintaining one of the given states in the absence of an electric field.

The prior art discloses methods for forming polymer beads from polymeric precursors in aqueous suspension such as, U.S. Pat. No. 2,932,629. U.S. Pat. No. 2,932,629 disclose a limited coalescent method for forming spheroid particles of highly uniform size through the use of colloidal particles to limit coalescence of smaller droplets into larger, uniform domains. The polymerizable liquid is brought to given size, and a catalytic agent performs the polymerization reaction to form solid polymeric bodies having substantially uniform size. The technique of using limited coalescence for uniform bead size during polymerization is further disclosed in U.S. Pat. Nos. 3,933,771, 4,324,932, and 4,833,060.

SUMMARY OF THE INVENTION

Accordingly, it is an object of the present invention to provide a sheet having a machine coatable polymerically dispersed light-modulating material of uniform domain size.

Another object of the present invention is to disperse liquid crystal material using limited coalescence and coat the dispersion to form a dispersed light-modulating layer having improved optical properties.

Sheets made in accordance with the present invention can be used to provide a re-writable image sheet. The present invention uses a colloidal solid particle emulsifier to limit domain growth from a highly dispersed state. Uniformly sized liquid crystal domains are created and machine coated to manufacture light-modulating, electrically responsive sheets with improved optical efficiency. The sheet can be formed using inexpensive, efficient photographic layer methods. A single large volume of sheet material can be coated and formed into various types of sheets and cards. Displays in the form of sheets in accordance with the present invention are inexpensive, simple and fabricated using low-cost processes.

These objects are achieved by a light-modulating, electrically responsive sheet comprising:

(a) a substrate;

(b) an electrically conductive layer formed over the substrate;

(c) a light-modulating layer disposed over the electrically conductive layer and including at least one dispersible light-modulating material and coalescence limiting material into which the dispersible light-modulating material(s) is provided so that such dispersible light-modulating material coalesces to form a limited coalesced material having a set of domains that exhibit different electrically responsive optical states.

Flexible sheets can efficiently be made in accordance with the present invention which has a light-modulating layer which has domains with improved optical properties. By changing the field applied across the layer, information can be written in the sheet.

BRIEF DESCRIPTION OF THE DRAWINGS

FIG. 3A is a schematic sectional view of a chiral nematic material in a planar state reflecting light;

FIG. 3B is a schematic sectional view of a chiral nematic material in a focal-conic light transmitting state;

FIG. 4 is a sectional view of a domain containing chiral nematic liquid crystal material;

DETAILED DESCRIPTION OF THE PREFERRED EMBODIMENT

Figure 1A:
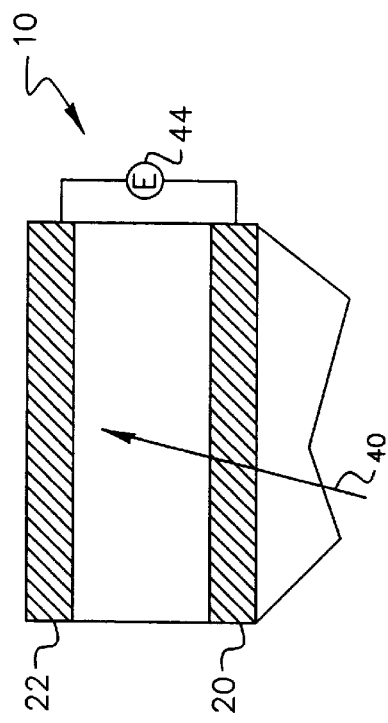
FIG. 1A is a sectional view of a sheet having a layer of polymer dispersed cholesteric liquid crystal material formed using conventional dispersion methods.

FIG. 1A is a sectional view of a portion of a sheet 10 having a conventional polymer dispersed light-modulating material. The sheet 10 includes a substrate 15. Substrate 15 can be made of a polymeric material, such as Kodak Estar film base formed of polyester plastic, and have a thickness of between 20 and 200 microns. For example, substrate 15 can be a 80 micron thick sheet of transparent polyester. Other polymers, such as transparent polycarbonate, can also be used. Alternatively, substrate 15 can be thin, transparent glass.

A first conductor 20 is formed over substrate 15. First conductor 20 can be a transparent, electrically conductive layer of tin-oxide or indium-tin-oxide (ITO), with ITO being the preferred material. Typically, first conductor 20 is sputtered onto the substrate 15 to a resistance of less than 250 ohms per square. Alternatively, first conductor 20 can be an opaque electrical conductor formed of metal such as copper, aluminum or nickel. If first conductor 20 is an opaque metal, the metal can be a metal oxide to create a light absorbing first conductor 20.

A light-modulating layer 30 is deposited over first conductor 20. Light-modulating layer 30 can contain a cholesteric liquid crystal of conventional design. The liquid crystal can be a chiral doped nematic liquid crystal, also known as cholesteric liquid crystal, such as those disclosed in U.S. Pat. No. 5,695,682. Application of fields of various intensity and duration change the state of chiral doped nematic materials from a reflective to a transmissive state. These materials have the advantage of maintaining a given state indefinitely after the field is removed. Cholesteric liquid crystal materials can be Merck BL112, BL118 or BL126 which are available from EM Industries of Hawthorne, N.Y. The light-modulating layer 30 is effective in two conditions, which will be described in more detail below. Other light reflecting or diffusing modulating, electrically operated materials can also be coated such as a micro-encapsulated electrophoretic material in oil, or rotating, multicolored spheres influenced by an electric field.

In one embodiment, a liquid crystal material is dispersed in water containing a water-soluble binder material such as de-ionized gelatin, polyvinyl alcohol (PVA) or polyethylene oxide (PEO). Such compounds are machine coatable on equipment associated with photographic films. It is important that the binder have a low ionic content. The presence of ions in such a binder hinders the development of an electrical field across the dispersed liquid crystal material. Additionally, ions in the binder can migrate in the presence of an electrical field, chemically damaging the light-modulating layer 30. The liquid crystal and gelatin emulsion are coated to a thickness of between 5 and 30 microns to optimize optical properties of light-modulating layer 30. The coating thickness, size of the liquid crystal domains, and concentration of the domains of liquid crystal materials are designed for optimum optical properties. This arrangement permits the formation of limited coalesced material having a set of domains that exhibit different electrically responsive optical states. Heretofore, the dispersion of liquid crystals is performed using shear mills or other mechanical separating means to form domains 32 of liquid crystal within light-modulating layer 30.

A second conductor 22 is applied to the surface of light-modulating layer 30. Second conductor 22 should have sufficient conductivity to carry a field across light-modulating layer 30. Second conductor 22 can be formed in a vacuum environment using materials such as aluminum, tin, silver, platinum, carbon, tungsten, molybdenum, or indium. Oxides of said metals can be used to darken patternable conductive layer 14. The metal material can be excited by energy from resistance heating, cathodic arc, electron beam, sputtering or magnetron excitation. Tin-oxide or indium-tin oxide coatings permit second conductor 22 to be transparent. Alternatively, second conductor 22 can be printed conductive ink such as Electrodag 423SS screen printable electrical conductive material from Acheson Corporation. Such printed materials are finely divided graphite particles in a thermoplastic resin.

FIG. 3A and FIG. 3B show two stable states of cholesteric liquid crystals. In FIG. 3A, a high voltage field has been applied and quickly switched to zero potential, which causes cholesteric liquid crystal molecules go into planar state 72. In FIG. 3B, application of a lower voltage field has caused molecules of the cholesteric liquid crystal to break into transparent tilted cells known as the focal-conic state 74. Increasing the time duration of a low-voltage pulse progressively drives the molecules in a planar state 72 towards a fully evolved and transparent focal-conic state 74.

A light absorber 70 can be positioned on the side opposing the incident light 40. In the fully evolved focal-conic state the cholesteric liquid crystal is transparent, passing incident light 40, which is absorbed by light absorber 70 to create a black image. Progressive evolution of the focal-conic state causes a viewer to perceive a reflected light 46 that transitions to black as the cholesteric material changes from planar state 72 to a fully evolved focal-conic state 74. The transition to the light transmitting state is progressive, and varying the low voltage time permits variable levels of reflection. These variable levels can be mapped out to corresponding gray levels, and when the field is removed, light-modulating layer 11 maintains a given optical state indefinitely. This process is more fully discussed in U.S. Pat. No. 5,437,811.

FIG. 4 is a cross section through a domain 32 containing a cholesteric material. Domain 32 is spherical, and cholesteric material anchors on the surface of the domain 32. Because the surface of domain 32 is spherical, incident light 40 from any angle of observation is reflected. The result is that these polymer dispersed (cholesteric) liquid crystals (PDChLC) have good off-axis reflectivity.

In an experiment, E.M Industries chiral nematic liquid crystal material BL-118 was dispersed in deionized photographic gelatin. The BL-118 cholesteric liquid crystal material had a concentration of chiral dopant sufficient to reflect green (550-nanometer) light. The liquid crystal material was dispersed at an 8% concentration in a 5% deionized gelatin solution. The mixture was dispersed using a Silverson mill. Changing the milling time varied the final droplet size. Mixtures were made having a mean domain size of 1, 4 and 9 micron. Using a conventional dispersion process, these domains vary in size by a ratio of 10:1. The materials were coated onto a sheet of ITO coated polyester having a sheet conductivity of 160 ohms per square. The coating was dried to provide a 9-micron thick polymerically dispersed cholesteric coating. The coated materials were effective.

Figure 1B:
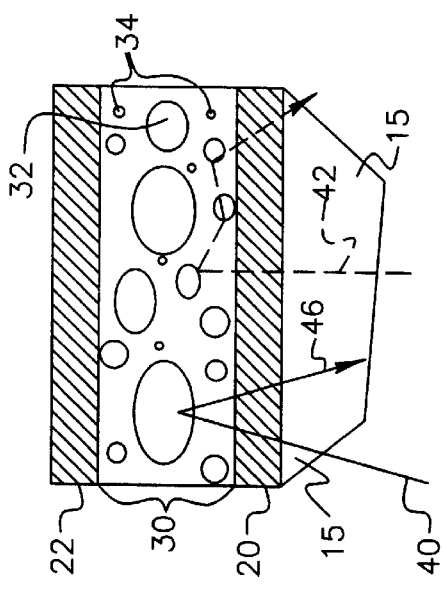
FIG. 1B is a sectional view of the sheet of FIG. 1A with an applied electrical field.

Returning to FIG. 1A, a sectional view is shown through the experimental sheet 10 which has domains of cholesteric material in deionized gelatin that act as light-modulating layer 30. Light-modulating layer 30 was printed with a black, electrical conductive material to create second conductor 22 which also acts as light absorber 70 for the cholesteric liquid crystal. A high voltage electrical field was applied to align the cholesteric liquid crystal in light-modulating layer 30 to be planar state 72 as shown in FIG. 3A. Cholesteric liquid crystal material in domains 32 aligned and all sheets 10 reflected a green reflective light 46 and some scattered light 42. In FIG. 1B, a low field was applied to sheet 10, converting the liquid crystal to the transparent focal-conic state 70 shown in FIG. 3B. Sheet 10 could be repeatedly changed between the planar and focal-conic states, and maintained a given state in the absence of any electrical field. The selective bimodal optical states seen in sheets 10 are useful in display sheets having memory, as set forth in the prior art.

Figure 5:
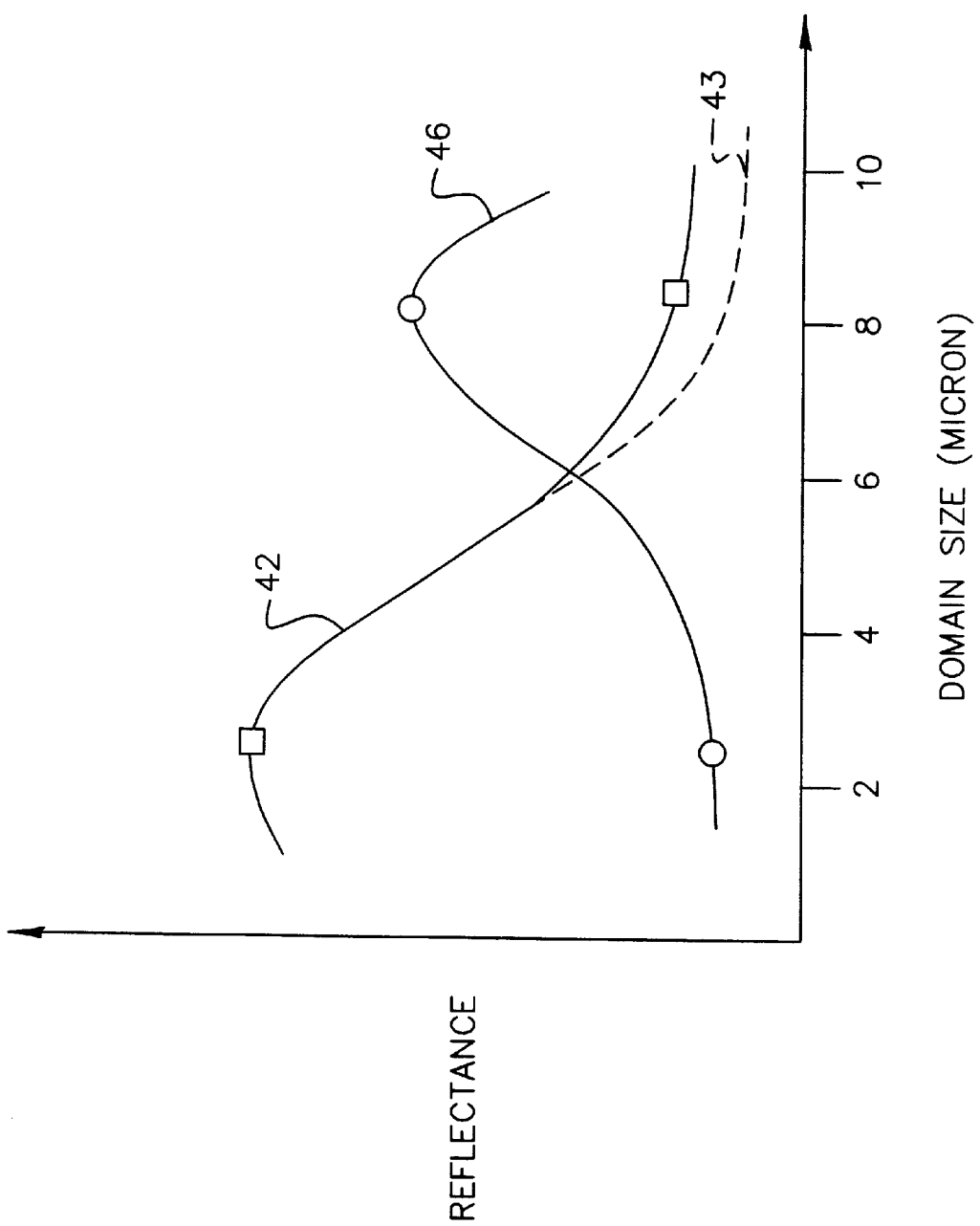
FIG. 5 is a graph of the reflectance vs. domain size of a cholesteric material using conventional and limited coalescence materials.

The dried coating had domain sizes varying in diameter by a ratio of 10:1. This creates large domains 32 and smaller parasitic domains 34. A series of coatings having the same material concentrations and thickness, but different mean domain size, were measured for reflectance. FIG. 5 graphs scattered light 42 and reflected light 46 versus domain size for conventional dispersions. At smaller mean domain sizes, such as 2 micron, domains 32 tend to scatter light 42, and have little reflected light 46. As domain size increases to 10 microns in size, domains 32 increase in reflected light 46 and decrease in scattered light 42. It is apparent that domains below 10 microns act more as diffusers than reflectors. Even with large domain sizes, parasitic domains 34 will act more to diffuse, distorting the purity of color reflection.

Sheets 10 were fabricated using limited coalescence materials and processing to form uniformly sized emulsions of liquid crystalline material. This was done by homogenizing the liquid crystalline material in the presence of finely divided silica, a coalescence limiting material, (LUDOX® from duPont Corporation). A promoter material was added to the aqueous bath to drive the colloidal particles to the liquid-liquid interface. In the example, a copolymer of adipic acid and 2-(methylamino)ethanol was used as the promoting agent in the water bath. The liquid crystal material was dispersed using ultrasound to create liquid crystal domains below 1 micron in size. When the ultrasound energy was removed, the liquid crystal material coalesced into domains of uniform size. The ratio of smallest to largest domain size varied by approximately 1:2. By varying the amount of silica and copolymer relative to the liquid crystalline material, uniform domain size emulsions of average diameter (by microscopy) approximately 1, 3, and 8 micron were produced. These emulsions were diluted into gelatin solution for subsequent coating.

Figure 2A:
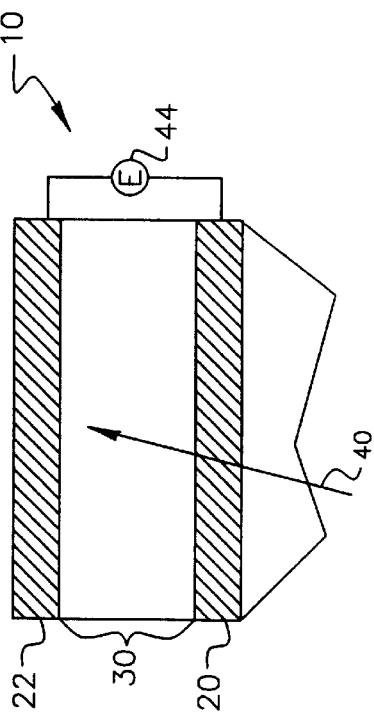
FIG. 2A is a sectional view of a sheet having a polymer dispersed limited coalescent cholesteric liquid crystal material.
Figure 2B:
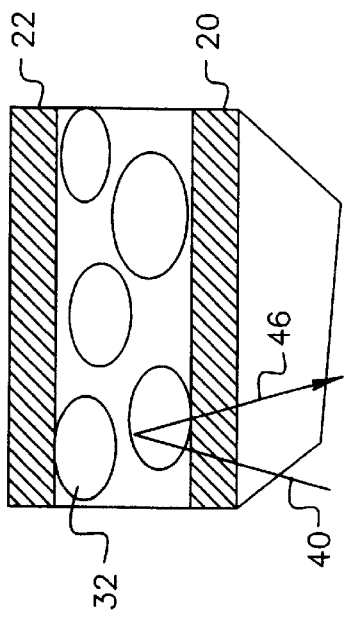
FIG. 2B is a sectional view of the sheet of FIG. 2A with an applied electrical field.

The limited coalescent materials were coated using a photographic emulsion coating machine onto sheets of polyester having an ITO coating with a sheet conductivity of 160 ohms per square. The coating was dried to provide a 9 micron thick polymerically dispersed cholesteric coating. FIG. 2A shows that domains 32 of a limited coalescent material maintained their uniform size after the addition of the surfactant and after being machine coated. Therefore, the present invention provides a uniform set of domains and they are responsive to an applied electrical field to change optical states. There were few, if any, parasitic domains 34 (having undesirable electro-optical properties) within the dried coatings. In FIG. 2B, the coated sheets 10 were bonded to a second sheet of ITO coated plastic and electric field 44 applied to align the liquid crystal material in light-modulating layer 30. The domains aligned and all sheets 10 became transparent with a minimum of scattering light 42. Therefore, the application of the electrical field permits information to be stored in the uniform domains.

Limited coalescence can be viewed as dispersing a light-modulating material below a given size, and using coalescent limiting material to limit the size of the resulting domains. Such materials are characterized as having a ratio of maximum to minimum domain size of less than 2:1. By use of the term "uniform domains", it is meant that domains are formed having a domain size variation of less than 2:1. Limited domain materials have improved optical properties.

A 0.10% concentration of sodium triisopropylnaphthalene sulfonate was added to the emulsion to permit the mixture to uniformly cover an ITO surface. The limited coalescent materials with the added surfactant were coated using a photographic coating machine onto sheets of polyester having an ITO coating with a sheet conductivity of 160 ohms per square. The coating was dried to provide a 9-micron thick polymerically dispersed cholesteric coating. FIG. 2A is a sectional view through a limited coalescent cholesteric liquid crystal sheet showing that domains 32 maintained their uniform size after the addition of the surfactant and after being machine coated. There were few, if any, parasitic domains 34 within the dried coatings.

The limited coalescent materials were coated with a black, electrical conductive material to create second conductor 22. A high voltage electrical field was applied to align the liquid crystal material in light-modulating layer 30 to the become planar state 72 in FIG. 3A. The domains aligned and when sheets 10 were excited by incident light 40, sheets 10 generated green reflective light 46 with little scattered light 42. In FIG. 2B, a low field was applied to sheet 10 to convert the liquid crystal to the transparent focal-conic state 70 in FIG. 3A. Sheets 10 can be repeatedly changed between the planar and focal-conic states, and maintained a given state in the absence of any electrical field. The selective bimodal optical states seen in sheets 10 are useful in display sheets having memory, as set forth in the prior art.

Figure 6:
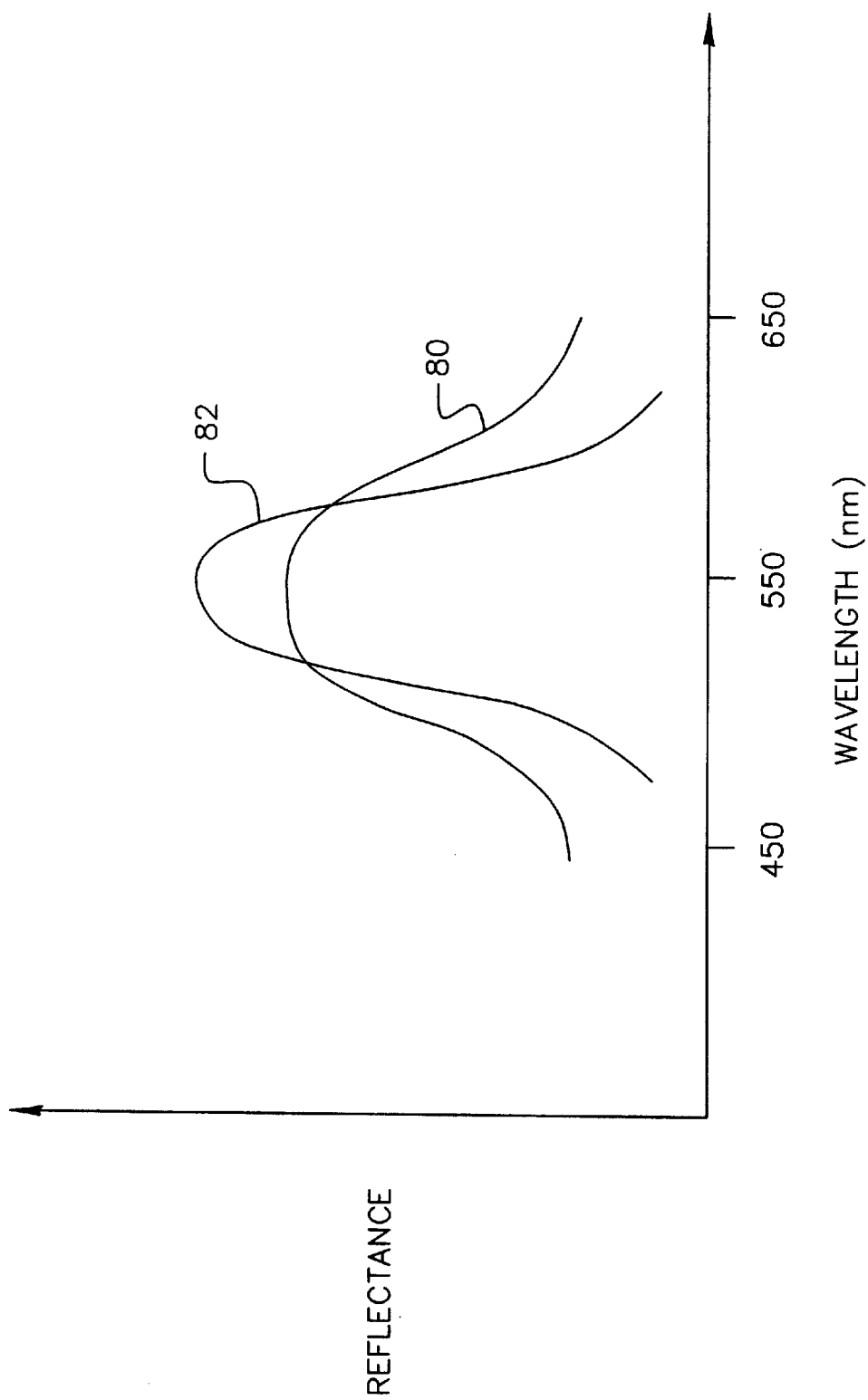
FIG. 6 is the spectral distribution of polymer dispersed cholesteric liquid crystal materials using conventional and limited coalescent dispersion methods.

Sheets 10 made by the limited coalescence process had curves similar to those of conventionally dispersed materials shown in FIG. 5. However, with 8 to 10 micron domains, the material had reduced scattering 43 due to the elimination of parasitic domains 34. FIG. 6 is a plot of the spectral distribution of a cholesteric material using conventional dispersion material 80 and limited coalescent dispersion material 82. The conventional dispersion materials reflect light in wavelengths outside the reflectivity cholesteric liquid crystal.

Conventionally dispersed cholesteric materials have parasitic domains 34, which reflect light in wavelengths outside the wavelengths reflected by the cholesteric material. Limited coalescent dispersions 85 had reduced reflection in other wavelengths due to the elimination of parasitic domains 34. The increased purity of color is important in the development of full color displays requiring well-separated color channels to create a full-color image. Limited coalescent cholesteric materials provide purer light reflectance than cholesteric liquid crystal material dispersed by conventional methods. It has also been proven that limited coalescent dispersions can be machine coated and maintain a uniform domain size.

The invention has been described in detail with particular reference to certain preferred embodiments thereof, but it will be understood that variations and modifications can be effected within the spirit and scope of the invention.

PARTS LIST 10 sheet
15 substrate
20 first conductor
22 second conductor
30 light-modulating layer
32 domains
34 parasitic domains
40 incident light
42 scattered light
43 reduced scattering
44 electric field
46 reflected light
70 light absorber
72 planar state
74 focal-conic state
80 conventional dispersion material
82 limited coalescence material

What is claimed is:

1. A light-modulating, electrically responsive sheet comprising:
   (a) a substrate;
   (b) an electrically conductive layer formed over the substrate;
   (c) a light-modulating layer disposed over the electrically conductive layer and including at least one dispersible cholesteric liquid crystal light-modulating material and coalescence limiting colloidal material into which the dispersible light-modulating material(s) is provided so that such dispersible cholesteric liquid crystal light-modulating material coalesces to form a set of domains having sizes within a range of from 6 to 12 microns that exhibit different electrically responsive optical states.

2. A light-modulating, electrically responsive sheet comprising:
   (a) a substrate;
   (b) an electrically conductive layer formed over the substrate;
   (c) a light-modulating layer disposed over the electrically conductive layer and including at least one dispersible cholesteric liquid crystal light-modulating material and coalescence limiting colloidal material into which the dispersible cholesteric liquid crystal light-modulating material(s) is provided so that such dispersible light-modulating material coalesces to form a set of uniform domains having sizes within a range of from 6 to 12 microns and providing a plurality of optical states.

3. The light;-modulating, electrically responsive display comprising:
   (a) a substrate;
   (b) an electrically conductive layer formed over the substrate;
   (c) a light-modulating layer disposed over the electrically conductive layer and including at least one dispersible cholesteric liquid crystal light-modulating material and coalescence limiting colloidal material into which the dispersible cholesteric liquid crystal light-modulating material(s) is provided to form a set domains having sizes within a range of from 6 to 12 microns and providing a plurality of optical states;
   (d) uniform set of domains being responsive to an applied electric field to change optical states; and
   (e) a second conductor layer disposed over the light-modulating layer and adapted to provide an electrical field when an electrical potential is applied between the conductive layer and the second conductive layer so that the uniform domains change optical state, wherein there are at least two optical states, wherein the application of the electrical field permits information to be stored in the uniform domains.

* * * * *